United States Patent [19]
Murto et al.

[11] 3,763,326
[45] Oct. 2, 1973

[54] TELEPHONE AUDIO SIGNALLING ARRANGEMENT

[75] Inventors: Tapio Henrikki Murto; Kenneth Douglas Emslie, both of Ottawa, Ontario, Canada

[73] Assignee: Bell Canada-Northern Electric Research Limited, Ottawa, Ontario, Canada

[22] Filed: May 22, 1972

[21] Appl. No.: 255,803

[52] U.S. Cl. .................................. 179/99, 340/384
[51] Int. Cl. ........................................... H04m 3/22
[58] Field of Search .................. 179/99; 340/384 E, 340/384 R

[56] References Cited

UNITED STATES PATENTS

| | | | |
|---|---|---|---|
| 3,665,112 | 5/1972 | Blake et al. | 179/99 |
| 3,493,966 | 2/1970 | Human | 340/384 |
| 3,697,982 | 10/1972 | Kawaki et al. | 340/384 |
| 3,594,786 | 7/1971 | Brunner et al. | 340/384 |

*Primary Examiner*—Kathleen H. Claffy
*Assistant Examiner*—Kenneth D. Baugh
*Attorney*—Alfred A. De Luca

[57] ABSTRACT

A telephone signalling system for signalling a station set in a key telephone system, said signalling system including an electronic tone-ringer which generates a tone at a first audio frequency when connected to a conventional 20Hz ringing supply. When the electronic tone-ringer is energized with an audio frequency voltage at an audio frequency greater than the first audio frequency, in lieu of the conventional 20Hz ringing supply, a different tone is generated by the electronic tone-ringer.

5 Claims, 1 Drawing Figure

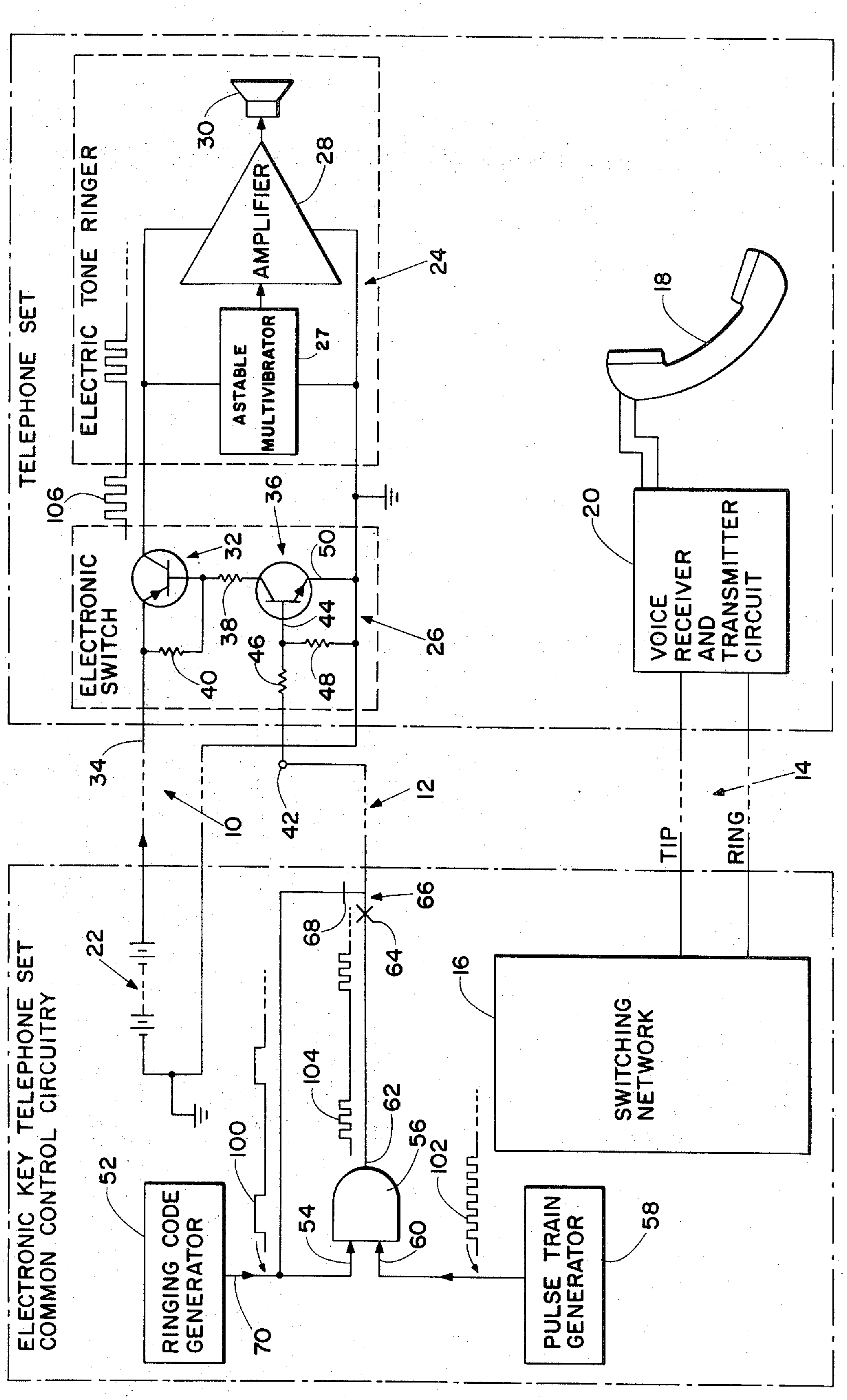
TELEPHONE SET
ELECTRIC TONE RINGER
AMPLIFIER
ASTABLE MULTIVIBRATOR
ELECTRONIC SWITCH
VOICE RECEIVER AND TRANSMITTER CIRCUIT
ELECTRONIC KEY TELEPHONE SET COMMON CONTROL CIRCUITRY
RINGING CODE GENERATOR
PULSE TRAIN GENERATOR
SWITCHING NETWORK
TIP
RING
10
12
14
16
18
20
22
24
26
27
28
30
32
34
36
38
40
42
44
46
48
50
52
54
56
58
60
62
64
66
68
70
100
102
104
106

TELEPHONE AUDIO SIGNALLING ARRANGEMENT

FIELD OF THE INVENTION

This invention relates to telephone ringing or audio signalling circuits and more particularly to a signalling arrangement, incorporating an electronic tone-ringer, capable of generating a plurality of ringing tones.

DESCRIPTION OF THE PRIOR ART

Electronic tone-ringers have recently attracted attention as an alternative audio signalling device to the electromechanical bell which is in almost universal use.

The electronic tone-ringers, like its counterpart the electromechanical bell must operate with the usual 20Hz ringing voltage supplied by the ringing-code generator, must remain insensitive to dialling pulses during the dialling operation, and must present a high impedance to the telephone line at all times.

A representative type of electronic tone-ringer, which generates a pleasing tone and which meets the above requirements, is described in United States Application No. 178,012 on an invention by Gulay Sencer, filed on 7 September 1971. This representative electronic tone-ringer, which is capacitor coupled to the telephone line, so as not to draw direct current from the telephone line, is designed as a direct replacement for the currently used electromechanical bell or ringer.

In an other electronic tone-ringer application, relating to a new Electronic Key Telephone System, a need has arisen for a tone ringer which can be powered from a direct current supply and controlled via a control circuit. Electronic Key Telephone Systems have recently appeared to meet the needs of subscribers requiring special communication features, without necessitating the use of a large number of conductors between the individual key telephone sets and the system common equipment. A representative Electronic Key Telephone System is described in Canadian Patent No. 876,374 issued to H.P. Anderson et al, on 20 July 1971.

Each telephone set or station set in this new Electronic Key Telephone System is connected to the common control circuitry via three separate circuits; a power circuit to provide power in the form of a direct current supply voltage, a control circuit for control function, and a talking circuit (e.g. tip and ring leads) for voice transmission.

It may be seen that if the tone-ringer referred to in the above patent application by Gulay Sencer is to be used in the new Electronic Key Telephone System, a means must be provided for bypassing the input coupling capacitor in order that a direct current voltage can energize the electronic tone-ringer. Additionally a means must be provided to control the flow of direct current to the electronic tone-ringer, by means of the control circuit, so as to provide the familiar ring and interrupt intervals during the signalling operation. In addition to the standard ringing tone, it would also be desirable to generate additional distinctive tones with the electronic tone-ringer to provide other signalling functions. Two possible uses for additional tones in an Electronic Key Telephone System would be an extended hold signal and a request for entry signal.

SUMMARY OF THE INVENTION

It has been found that additional audio frequency tones can be generated by an electronic tone-ringer of the type invented by Gulay Sencer by supplying such an electronic tone-ringer with an audio frequency operating voltage at a frequency higher than the frequency of the tone signal generated by the electronic tone-ringer in its normal ringing mode (a sub-sonic or direct current operating voltage is used for the normal ringing mode). The waveform of the audio frequency supply voltage is not critical and may take any one of a large number of waveform shapes such as sinusoidal, triangular or rectangular. In practice a rectangular waveform has been used, as a rectangular pulse train can easily be generated and controlled in the aforementioned new Electronic Key Telephone System with a minimal of additional circuitry. The frequency of the tone signal produced by the electronic tone-ringer when supplied with an audio frequency operating voltage in lieu of the usual sub-sonic operating voltage (direct current or 20Hz) corresponds to the frequency of the audio frequency operating voltage.

Thus in accordance with the present invention, the audio signalling arrangement comprises an electronic tone-ringer of the type which generates a tone signal of a first audio frequency when supplied with a direct current operating voltage. The electronic tone-ringer comprises an electronic oscillator coupled via an audio amplifier to an electro-acoustic transducer. A signalling generator for generating an audio frequency operating voltage at a frequency greater than the first audio frequency of the first tone signal is arranged for connection to the electronic tone-ringer so as to operate said ringer. Said ringer in turn generates a second tone signal at an audio frequency greater than the first audio frequency of the first tone signal.

BRIEF DESCRIPTION OF THE DRAWING

An example embodiment of the invention will now be described with reference to the accompanying drawing in block diagram form of an audio signalling arrangement in accordance with the present invention.

DESCRIPTION OF THE PREFERRED EMBODIMENT

Referring to the drawing, the telephone signalling arrangement used in the new Electronic Key Telephone Set comprises two distinct portions: the Key Telephone Set Common Control Circuitry outlined on the left portion of the drawing, and a remotely located Telephone or Station Set outlined on the right hand portion of the drawing. This telephone set is remotely connected via three separate circuits to the common control circuitry; a power circuit 10, a control circuit 12 and a voice circuit 14. Although only one telephone set is shown in the drawing it is understood, however, that the new Electronic Key Telephone System would have a large number of telephone sets and each set would be connected to the common control circuitry via three separate circuits as shown for the representative telephone set.

Part of the Common Control Circuitry includes a switching network 16, which is used to interconnect the talking circuits of the various telephone sets which form part of the Electronic Key Telephone System. Each handset 18, of each telephone set, is connected, via corresponding voice receiver and transmitter circuits 20, and tip and ring conductors of the voice circuit 14, to the switching network 16.

As the invention is directed to a new signalling arrangement no further discussion will be directed to the voice circuits as the interested reader may find representative voice circuit designs in various publications such as aforementioned Canadian Patent No. 876,374 issued on July 20, 1971 to H.P. Anderson et al.

In the new signalling arrangement illustrated in the drawing, a direct current supply 22 is connected, via a power circuit 10 and an electronic switch 26 to an electronic tone-ringer 24. The electronic tone-ringer 24 essentially comprises an electronic oscillator 27, such as an astable multivibrator, coupled via an amplifier 28 to a louspeaker 30 or other suitable electroacoustic transducer. If the electronic tone-ringer described in the Sencer application is used, the electronic switch would shunt the input coupling capacitor.

The electronic switch 26, which is conventional in form and operation, comprises a first transistor 32 serially interposed between the direct current supply 22 and the electronic tone-ringer 24 to interrupt the flow of direct current along conductor 34 of the power circuit 10. A second transistor 36 is arranged with a first resistor 38 and a second resistor 40 to control the conduction of the first transistor 32. The electronic switch 26 is provided with a control input 42 which is connected to the base 44 of the second transistor 36 via a third resistor 46. In addition a fourth resistor 48 joins the base 44 and emitter 50 of the second transistor 36.

The electronic key telephone set common control circuitry associated with the audio signalling arrangement comprises a ringing code generator 52 connected to one input 54 of an AND gate 56 and a pulse train generator 58 connected to the other input 60 of said AND gate 56. The output terminal 62 of the AND gate 56 is connected via normally open or make contacts 64 of transfer switch 66, and the control circuit 12, to the control input 42 of the electronic switch 26. The normally closed or break contacts 68 of the transfer switch 66 shunt the output 70 of the ringing code generator 52 to the control input 42 of the electronic switch 26 via the control circuit 12.

OPERATION OF THE PREFERRED EMBODIMENT

In the normal ringing mode a voltage with a rectangular waveform 100 appears at the output 70 of the ringing code generator 52 and is transmitted via normally closed contacts 68 of the transfer switch 66 and the control circuit 12, to the control input 42 of the electronic switch 26. In a more conventional key telephone system the output voltage from the ringing code generator would have a 20Hz waveform and would be of sufficient magnitude to operate an electromechanical bell. In the new Electronic Key Telephone however, a rectangular waveform 100 is used at a voltage level compatible with associated low power circuits.

As the voltage at the control input 42 of the electronic switch 26 varies in accordance with waveform 100, the second transistor 36 and the first transistor 32 are switched ON and OFF to interrupt the flow of direct current from the direct current supply 22 to the electronic tone-ringer 24.

The duration of the tone and the interval between tones are directly and respectively related to the pulse width and the interval between pulses of the voltage represented by waveform 100. Typical tone durations and intervals between tones are one second and three seconds respectively.

When additional signalling tones are to be generated by the electronic tone-ringer of the key telephone set transfer switch 66 is first actuated to introduce AND gate 56 into the control circuit 12 by closing make contacts 64 and opening break contacts 68. The voltage generated by the ringing code generator 52, and the wave train having a fundamental frequency higher than that of the astable multivibrator 27 and generated by pulse train generator 58 (waveform 102) are ANDed by the AND gate 56. A resulting waveform 104 appears at the output terminal 62 of the AND gate 56. This resulting waveform 104 is sent via closed make contacts 64 of the transfer switch 66 to the control input 42 of the electronic switch 26. The first transistor 32 is switched ON and OFF in accordance with waveform 104 to interrupt the direct current voltage applied to the tone-ringer 24 in accordance with waveform 106.

Voltage waveforms 106 and 104 have substantially identical patterns but represent different voltage amplitudes as the electronic switch 26 provides a suitable degree of power gain from the control signal over the operating voltage applied to the electronic tone-ringer 24.

By varying the frequency of the pulse train generator 58, the frequency of the resulting tone generated by the electronic tone-ringer 24 can be controlled as desired. Additionally the duration of the tone burst and the interval between tone burts can be controlled by changing the pulse width and the interval between pulses of the voltage generated by the ringing code generator 52.

It can readily be seen that the above described audio tone signalling arrangement can be used to generate a wide range of distinct audio signals at a remotely located telephone set or station set under the control of centrallized common control circuitry.

What is claimed is:

1. In a telephone system, audio signalling arrangement comprising:

a. an electronic tone-ringer, in a telephone set, which generates a first tone signal at a first audio frequency when supplied with a direct current operating voltage; said tone-ringer having an electronic oscillator coupled via an audio amplifier to an electro-acoustic transducer, said direct current operating voltage being supplied to power input terminals of the electronic oscillator and the audio amplifier;

b. a signalling generator, in common control circuitry, for generating an audio frequency operating voltage at a second audio frequency greater than the first audio frequency of the first tone signal;

(c) switching means, in the telephone set, responsive to the audio frequency operating voltage for interrupting the direct current operating voltage being supplied to said tone-ringer at the rate of said second audio frequency, so that the electronic tone-ringer generates a second tone signal at said second audio frequency.

2. In a telephone system, an audio signalling arrangement comprising:

a. an electronic tone-ringer in a telephone set which generates a first tone signal at a first audio frequency when supplied, from a power source, with a direct current operating voltage; said tone-ringer comprising an astable multivibrator coupled via an audio amplifier to an electro-acoustic transducer, said direct current operating voltage being supplied to the power input terminals of the astable multivibrator;

b. switch mean, in series with the power source, having a control input, and controllable to interrupt the direct current operating voltage;

(c) means for generating a plurality of pulses with a pulse frequency greater than the first audio frequency of the first tone signal, and for connecting said pulses to said control input to control the switch means, whereby the electronic tone-ringer is supplied from the power source, via the switch means, with a pulsating direct current operating voltage to generates a second tone signal at an audio frequency corresponding to the pulse frequency.

3. In a telephone system, an audio signalling arrangement comprising:

a. a ringing-code generator for generating sub-sonic ringing signals;

b. an electronic tone-ringer which generates a first tone signal at a first audio frequency when supplied with a direct current operating voltage; said tone-ringer comprising an astable multivibrator coupled via an audio amplifier to an electro-acoustic transducer;

c. switch means, having a control input, for connecting the electronic tone-ringer to a source of supply voltage in response to a control signal at said control input;

d. means for generating a pulse train with a pulse frequency greater than the first audio frequency of the first tone signal;

e. means, responsive to a ringing signal from the ringing-code generator and to said pulse train, for supplying a pulsating control signal to said control input;

whereby the electronic tone-ringer is supplied via the switch means with a pulsating operating voltage to generate on an interrupted basis as determined by the ringing signals, a second tone signal at an audio frequency, corresponding to the pulse frequency of the pulse train, and greater than the first audio frequency of the first tone signal.

4. The audio frequency signalling arrangement as claimed in claim 3 wherein the switch means comprises an electronic switch and the means for supplying the pulsating control signal to said control input comprises a dual input electronic gate.

5. The invention as claimed in claim 1 wherein the electronic oscillator is an astable multivibrator, and the means for generating an audio frequency operating voltage includes an electronic switch serially connected between the electronic tone-ringer and a direct current supply.

* * * * *